US006935394B2

(12) United States Patent
Durif et al.

(10) Patent No.: US 6,935,394 B2
(45) Date of Patent: Aug. 30, 2005

(54) TIRE BEAD REINFORCEMENT COMPRISING DISCONTINUOUS REINFORCING ELEMENTS

(75) Inventors: Pierre Durif, Enval (FR); Gilles Sallaz, Ceyrat (FR); Philippe Gervais, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/007,236

(22) Filed: Dec. 9, 2004

(65) Prior Publication Data

US 2005/0087281 A1 Apr. 28, 2005

Related U.S. Application Data

(63) Continuation of application No. PCT/EP03/06053, filed on Jun. 10, 2003.

(30) Foreign Application Priority Data

Jun. 10, 2002 (FR) .............................................. 02 07077

(51) Int. Cl.$^7$ ........................... B60C 15/06; B60C 15/00
(52) U.S. Cl. ....................... 152/543; 152/456; 152/539; 152/542

(58) Field of Search ................................ 152/456, 539, 152/542, 543, 555

(56) References Cited

U.S. PATENT DOCUMENTS

| 5,529,104 | A | | 6/1996 | Delias et al. | |
| 5,783,003 | A | * | 7/1998 | Lescoffit | ................. 152/555 X |
| 6,443,204 | B1 | | 9/2002 | Auxerre | |
| 6,460,589 | B1 | | 10/2002 | Auxerre | |
| 6,463,975 | B1 | * | 10/2002 | Auxerre | ................. 152/543 X |
| 6,491,078 | B2 | * | 12/2002 | Corsi | ......................... 152/539 |
| 6,622,765 | B1 | * | 9/2003 | Corsi | ......................... 152/539 |

FOREIGN PATENT DOCUMENTS

JP          2001/233025          8/2001

* cited by examiner

*Primary Examiner*—Adrienne C. Johnstone
(74) *Attorney, Agent, or Firm*—Burns, Doane, Swecker & Mathis, LLP (57) ABSTRACT

A tire for vehicles carrying heavy loads, comprising in at least one bead an additional reinforcement composed of a plurality of discontinuous reinforcing elements, these discontinuous reinforcing elements being orientated essentially circumferentially to form a plurality of circles C, C1, C2 concentric on the rotation axis of the tire mounted on its rim, each circle being defined by a mean radius (R, R1, R2) measured relative to the said rotation axis.

18 Claims, 5 Drawing Sheets

TIRE BEAD REINFORCEMENT COMPRISING DISCONTINUOUS REINFORCING ELEMENTS

This application is a continuation of International Application PCT/EP03/06053 filed on Jun. 10, 2003.

FIELD OF INVENTION

The invention concerns a tire with radial carcass reinforcement intended for fitting on vehicles carrying heavy loads and more particularly construction machinery or heavy vehicles.

BACKGROUND OF INVENTION

A tire with radial carcass reinforcement comprises a crown zone surmounted radially on the outside by a tread designed to come in contact with the ground during the rolling of the said tire, with two sidewalls which extend the crown axially and radially on either side and which end in zones forming tire beads. The tire is then fitted on a mounting rim comprising rim seats of frustoconical or cylindrical shape which may or may not be extended by flanges, depending on the type of tire, these seats or flanges when present being extended by rim hooks of substantially circular shape.

The beads of the said tire come in contact with the seats and hooks of this mounting rim. The carcass reinforcement of the tire consists of a plurality of reinforcing elements (of cable or filament type, generally metallic) embedded in at least one rubber mix, the said reinforcing elements being orientated substantially in the meridian direction (i.e. in a direction making an angle close to 90° with the circumferential direction of the tire). To anchor the reinforcing elements in the tire bead, at least one circumferential bead reinforcement is provided and the carcass reinforcements can be turned up around the said bead reinforcement to form an upturn, or overlaid axially against the said reinforcement.

Under the combined action of the load carried by the tire and the rolling, the parts of the tire sidewalls near the footprint of the tire on the ground undergo cyclic variations of curvature. In this area the sidewalls undergo bending around the rim hooks in a meridian plane (i.e. a plane containing the rotation axis of the tire). Moreover, the compression of the tire engenders alternating and cyclic movements of the reinforcing elements of the carcass reinforcement in the sidewalls in the circumferential direction, which give rise to more or less substantial movement of the beads relative to the rim hooks. These movements are the larger, the greater is the load supported. The same applies when the tire size increases and also when the form ratio of the tire is small (H/S<1, where H is the height of the tire's cross-section and S is the width of the said cross-section).

Under the effect of these alternating movements in the circumferential and meridian directions, the beads rub against the hooks of the mounting rim and undergo wear to a greater or lesser extent. To reduce this wear, it is known, besides using rubber mixes that are less sensitive to frictional wear, to arrange in each bead at a greater or smaller height (i.e. radially towards the outside) in the sidewalls at least one additional reinforcement consisting of a plurality of reinforcing elements (metallic cables or wires) positioned next to one another and orientated at small or zero angle relative to the circumferential direction (small or zero angle is understood to mean an angle between 0° and 15°).

These reinforcing elements may be continuous, i.e. making at least one complete turn, or discontinuous, i.e. extending over an angular fraction of one turn smaller than 360°. The said additional reinforcement may be located axially inside or outside the carcass reinforcement or axially against the upturn when the carcass reinforcement is anchored by turning up for example around a bead wire.

When reinforcements are used which extend over an angular fraction smaller than 360° (such reinforcements being referred to as "discontinuous" in the present document), endurance problems associated with certain distributions of the ends of the discontinuous reinforcements can arise, bearing in mind the cycles of repeated stresses during rolling, described earlier.

SUMMARY OF THE INVENTION

The object of the invention is a tire for vehicles carrying heavy loads, comprising a crown zone extended axially and radially by sidewalls, the latter in turn extended by beads designed to come in contact with a mounting rim of the tire, the said rim comprising a portion that forms a rim seat extended radially outwards by a rim hook of substantially circular external profile, the sidewalls of the tire being reinforced by a radial carcass reinforcement, the said radial carcass reinforcement extending within the tire beads and being anchored on a circumferential bead reinforcement. The tire also comprises, in at least one bead, an additional reinforcement consisting of a plurality of discontinuous reinforcing elements of short length L0, these discontinuous reinforcing elements being arranged essentially circumferentially on a plurality of concentric circles C, each circle C being defined by a mean radius R measured relative to the rotation axis of the tire. Each discontinuous reinforcing element of length L0 arranged on a circle C of radius R is mechanically coupled over coupling lengths L11 and L12 respectively with two discontinuous reinforcing element arranged on a circle C1 of radius R1 smaller that the radius R, the said circle being immediately adjacent to the circle C, wherein the coupling lengths L11 and L12, L11 being taken as greater than or equal to L12, satisfy the following relationship:

$$1.5 \leq K \leq 4$$

$$\text{where: } K = \frac{\left(1 - \frac{L12}{L0}\right)}{\left(1 - \frac{L11}{L0}\right)}$$

If this relationship is respected for all the discontinuous reinforcing elements of all the circles, an optimum distribution of the ends of the said discontinuous reinforcing elements is obtained, which enables the problems mentioned in relation to the prior art to be avoided.

This optimum distribution can be produced by placing the additional reinforcement on the tire blank shaped as a torus or on a building drum, before shaping the said reinforcement.

The relationship applies whether or not the length L0 is the same for all the cables.

More preferably still, K is such that: $2 \leq K \leq 2.5$.

Of course, when the continuous reinforcing elements are said to be arranged on concentric circles, this must be understood to mean that the reinforcing elements can be arranged on spirals and that each reinforcing element is arranged on a curve similar to an arc of a circle.

In a variant of the invention in which the cables are all of the same length L0, the tire is characterized in that:

each discontinuous reinforcing element of length L0 located on a circle C of radius R is coupled mechanically over coupling lengths L11 and L12 respectively, with two discontinuous reinforcing elements located on a circle C1 of radius R1 smaller than the radius R, the said circle being immediately adjacent to the circle C, such that the coupling length L11 is between 55 and 75% of the length L0 and the coupling length L12 is between 10 and 30% of L0;

each discontinuous reinforcing element of the same circle C of radius R is coupled mechanically over coupling lengths L21 and L22 respectively, with two discontinuous reinforcing elements located on a circle C2 of radius R2 immediately adjacent to the circle C1, the radius R2 being smaller than R1, such that the coupling length L21 is between 20 and 40% of L0 and the coupling length L22 is between 45 and 65% of L0.

It is understood that these mechanical coupling ratios apply between the discontinuous reinforcements arranged around all the circles except for the two consecutive circles radially closest to the rotation axis.

Preferably, the length of the discontinuous reinforcement elements is between ⅓ and 1/12 of the circumferential length of the circumferential bead reinforcement, taken at the radially innermost points of the said reinforcement.

If D0 and M0 respectively denote the average distance between the ends of two reinforcing elements on the circle C and the centre of the arc between those ends, and D1 and M1 respectively denote the average distance between the ends of two reinforcing elements on a circle C1 adjacent to the circle C and the centre of the arc between those ends, it has been found advantageous for the distance between the centers M0 and M1 to be a length of arc at least greater than half the length of arc separating the most distant ends on a given same circle. This gives a circumferential distribution of circle arcs without reinforcement which is optimum in terms of the fatigue performance of the additional reinforcement, while at the same time producing a structure whose rigidities are circumferentially homogeneous. To measure the arc length between the centre points M0 and M1, the radially innermost point is projected on the circle to which the radially outermost point belongs. Preferably, the length between the centers M0 and M1 is greater than 30% of L0.

Preferably, the radially outer limit of the additional reinforcement is located within an angular sector open axially towards the inside and radially towards the outside making an angle α at most equal to 90° with a direction parallel to the axial direction, when the tire of the invention is mounted on its rim, the said angular sector being measured from a line passing through the centre of the mean profile of the rim hook and parallel to the rotation axis.

In the case of mounting on a rim that comprises seats extended by flanges themselves ending in rim hooks, it is preferable for the angle α to be equal to at most 80°.

This limit enables the cycles of stresses in the reinforcing elements of the said reinforcement to be reasonably restricted, as well as the maximum deformations withstood by the reinforcing elements during impacts with objects.

As reinforcing elements of the additional reinforcement, one can use metallic cables of the type called "mono-modular", i.e. ones whose force-elongation curve has a single average slope (corresponding by definition to the cable's modulus of elasticity), or so-termed "bi-modular" cables, i.e. ones whose force-elongation curve has at least two different slopes either side of a transition point (the force-elongation curve has two distinct slopes, the slope at the origin and at small elongations being less steep than the slope at large elongations).

In applications of the invention to tires mounted on rims whose seats are directly extended by rim hooks and when discontinuous mono-modular cables are used as the reinforcing elements of the additional reinforcement, it is preferable for the radially outer limit of the said reinforcement to be within an angular sector open axially inwards and radially outwards and making an angle α of at most 75° with a direction parallel to the axial direction when the tire of the invention is mounted on its rim, this angular sector being measured from a line passing through the centre of the mean profile of the rim hook and parallel to the rotation axis. For these same types of tires, the radially outer limit of the said reinforcement is located within an angular sector open axially inwards and radially outwards making an angle α of at most 90° with a direction parallel to the axial direction, subject to the advantageous condition that elastic (bi-modular) discontinuous cables are used.

In applications of the invention to very large tires (in particular for construction machinery) mounted on rims having flanges extended by rim hooks, and when discontinuous mono-modular cables are used as the reinforcing elements of the additional reinforcement, it is preferable for the radially outer limit of the said reinforcement to be within an angular sector open axially inwards and radially outwards and making an angle α of at most 45° with a direction parallel to the axial direction when the tire of the invention is mounted on its rim, this angular sector being measured from a line passing through the centre of the mean profile of the rim hook and parallel to the rotation axis. For these same types of tires, in particular for construction machinery, the radially outer limit of the said reinforcement is located within an angular sector open axially inwards and radially outwards making an angle α of at most 75° with a direction parallel to the axial direction, subject to the advantageous condition that elastic (bi-modular) discontinuous cables are used.

In addition, it is advantageous to use within one and the same ply of the additional reinforcement or in two distinct, superimposed plies forming one and the same additional reinforcement, discontinuous cables of different natures (namely mono-modular and bi-modular). In such a case it is advantageous for the mono-modular and bi-modular discontinuous cables to be limited within respective angular sectors corresponding to those describes earlier. Preferably, the inner limit is located in a sector making an angle of at most 45° with the same direction, each of the said sectors having its top at the centre of the external profile of the rim hook.

The additional bead reinforcement according to the invention can comprise several discontinuous reinforcing plies, the said plies being located:

either on the same side as the carcass reinforcement (axially inside or outside it);

or on the same side of the upturn of the carcass reinforcement (axially inside or outside it);

or on either side of the carcass reinforcement or its upturn (axially inside and outside);

or axially outside the carcass reinforcement and axially inside the upturn of the carcass reinforcement;

or axially inside the carcass reinforcement and axially outside the upturn of the carcass reinforcement.

BRIEF DESCRIPTION OF THE DRAWINGS

Other characteristics and advantages of the invention emerge from the description given below with reference to the attached drawings, which illustrate several embodiments of the object of the invention presented as non-limiting examples.

DESCRIPTION OF THE PREFERRED EMBODIMENTS

Figure 1:
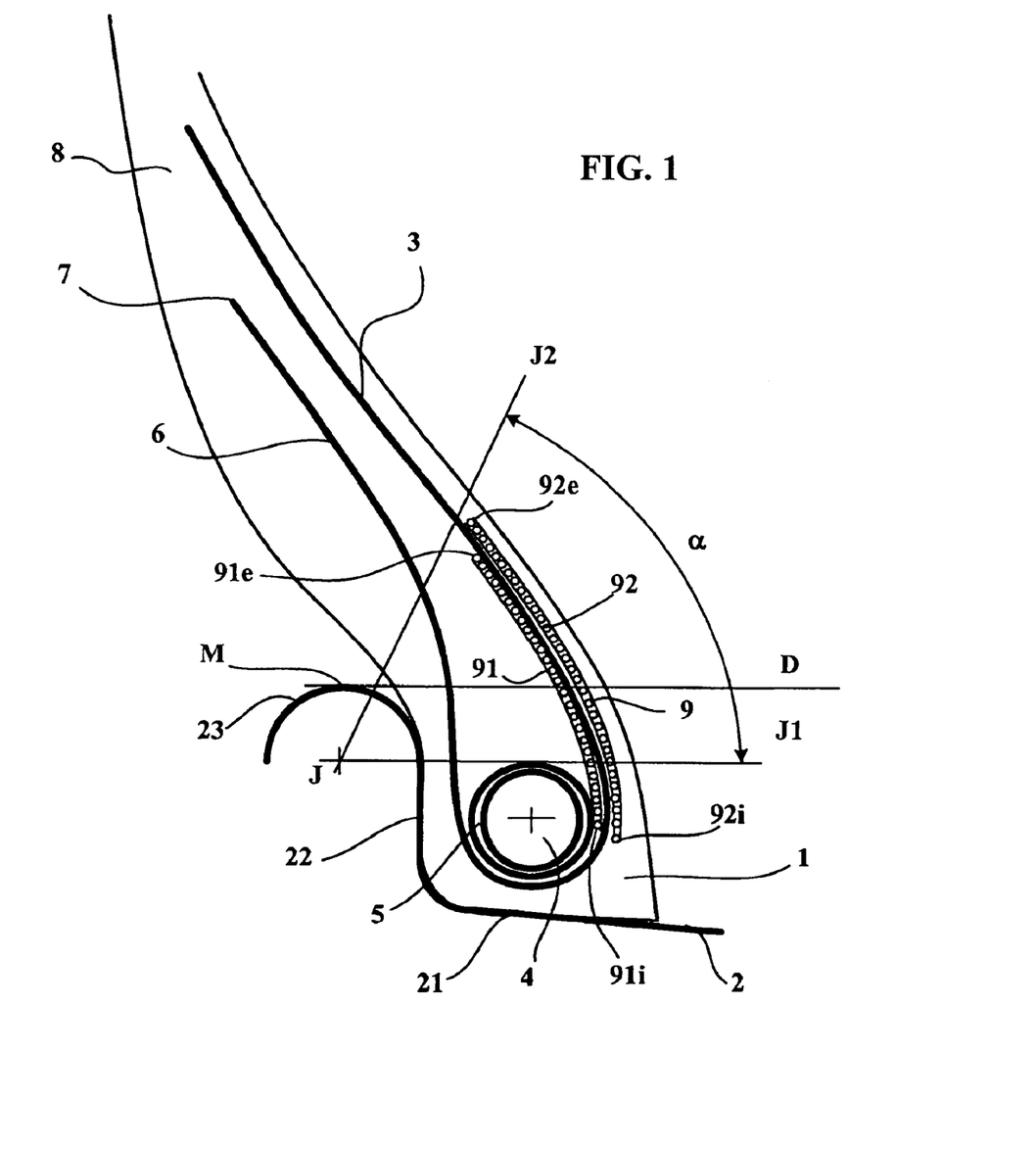
FIG. 1 shows a meridian section of a tire bead according to the invention with an additional reinforcement formed of two plies arranged either side of the carcass reinforcement.

A tire of size 45/65 R 45 was produced and is shown in FIG. 1 mounted on a rim 2, viewed in partial cross-section. In FIG. 1 the mounting rim 2 comprises a portion forming a seat 21 extended axially and radially outwards by a flange 22 perpendicular to the rotation axis, this flange 22 ending in a part forming a rim hook 23 whose profile is substantially circular with its centre at J. FIG. 1 also shows a sidewall 8 extended by a bead 1 of the tire according to the invention mounted on a mounting rim 2 and inflated to its working pressure. The tire comprises a carcass reinforcement 3 reinforced by metallic cables formed of 68 hooped 0.26 mm wires, this carcass reinforcement 3 being turned up within each bead around a circumferential bead reinforcement 4; in the present case, the circumferential bead reinforcement is a metallic bead wire 4 provided all round with a thickness of rubber mix 5 designed to avoid direct contact between the reinforcing elements of the carcass reinforcement 3 and the said bead wire 4. The carcass reinforcement 3 is turned up around the bead wire 4 to form an upturn 6 whose end 7 is designed to be located in the sidewall, i.e. radially beyond the radially outermost point M of the hook 23 of the rim 2.

Besides, this bead 1 includes an additional reinforcement 9 comprising two plies 91 and 92 each formed of a plurality of discontinuous metallic cables orientated essentially in the circumferential direction and covered with rubber mix. Each of these plies 91, 92 is positioned against the carcass reinforcement 3, i.e. against the part not turned up around the bead wire 4, with one of the plies positioned axially inside the carcass reinforcement and the other axially outside the said reinforcement. Viewed in meridian section as in FIG. 1, each of the two plies 91, 92 has a bottom end 91$i$ and 92$i$ respectively and a top end 91$e$ and 92$e$ respectively: the bottom ends 91$i$ and 92$i$ are preferably located radially below a line D parallel to the rotation axis and passing through the radially outermost point M of the rim hook 23 and the top ends 91$e$ and 92$e$ are preferably at different heights to avoid any singularity of deformation and stress.

Each ply 91, 92 of the additional reinforcement 9 consists of a plurality of sections of metallic cables made as bi-modular cables of 24 wires 0.26 mm in diameter having a first modulus of elasticity at small elongations equal to 25 GPa and a second modulus of elasticity at higher elongations equal to 78 GPa (the transition point on the force-elongation curve occurring at about 0.5% deformation). These discontinuous cables are all essentially the same length L0 equal in the present case to 676 mm, or 67.9% of the circumferential length of the bead wire 4 (measured along the radially innermost points of the bead wire). The rubber mix of the plies 91, 92 is a rubber mix with modulus preferably at most equal to 1.2 daN/mm$^2$.

Preferably, and as shown in FIG. 1, the ply 92 of the additional reinforcement 9 axially nearest the inside of the tire is that which extends highest within the sidewall 8. The top ends 91$e$ and 92$e$ of the plies of the additional bead reinforcement 9 are advantageously located within an angular sector of angle α, this angular sector being between a line J1 passing through the point J and parallel to the axial direction of the tire and a line J2 passing through the same point J, the angle α of the said sector being such that it is open axially inwards, radially outwards, and equal to at most 90° (65° in the present case).

Figure 2:
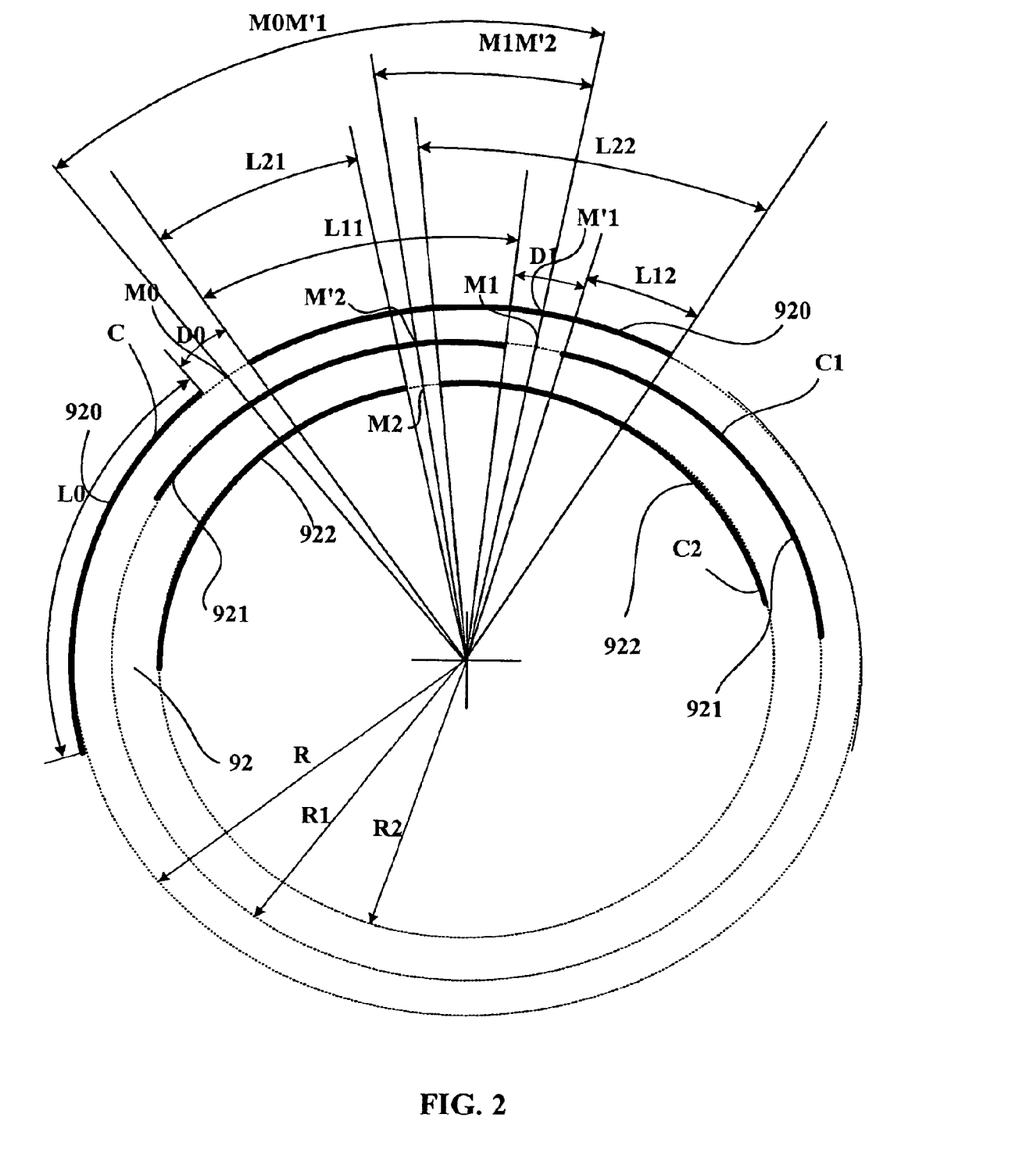
FIG. 2 shows the arrangement of reinforcing elements in a ply of the reinforcement used in the bead shown in FIG. 1.

FIG. 2 shows the arrangement of the reinforcing elements in a given ply of the additional reinforcement 9 having the structure shown in FIG. 1, along three adjacent circles C, C1, and C2, each circle being centered on the rotation axis of the mounted assembly (tire and rim). All the reinforcing elements have essentially the same length, in this case equal to 676 mm.

The discontinuous reinforcing elements can also be textile elements.

The distance between adjacent circles C, C1 and C2 on which the discontinuous reinforcing elements are arranged, is equal to the diameter of the reinforcing elements increased by at least 0.5 mm.

In FIG. 2 the ply 92 is illustrated in part, with the rotation axis of the tire perpendicular to the plane of the figure. It can be seen that a reinforcing element 920 of length L0 on the circle C of radius R is coupled along lengths of arc L11 and L12 with two elements 921 of the circle C1 of radius R1 (R1 less than R) adjacent to the circle C, and the same element 920 of length L0 on the circle C of radius R is coupled along lengths of arc L21 and L22 with two elements 922 of the circle C2 of radius R2 adjacent to the circle C1. In the case shown, the coupling lengths are:

L11=446 mm (or 66% of L0)
L12=108 mm (or 16% of L0)
L21=190 mm (or 28% of L0)
L22=351 mm (or 52% or L0)

These coupling lengths satisfy the relationship:

$$1.5 \leq K \leq 4$$

In effect, the value of K is 2.47 when considering the coupling values between a reinforcing element of length L0 on the circle C and the reinforcing elements 921 of the circle C1 of radius R1 (R1 smaller than R) adjacent to the circle C.

Besides, the mean arc lengths delimited by the facing ends of two consecutive reinforcing elements on the same circle C, C1 and C2 are, respectively, of the order of 104, 95 and 86 mm. The centers of the arcs separating the facing ends of two elements 920, 921, 922 arranged consecutively on the same circle C, C1 and C2 are respectively denoted as M0, M1 and M2. For the tire according to the invention, the arc length M0M'1 is larger than the arc length D0 between the facing ends of two consecutive reinforcing elements on the same circle C (the point M'1 corresponds to the point of intersection with the circle C, of the radius passing through M1 and extended as far as the circle C). Similarly, the arc length M1M'2 is greater than the arc length D1 separating the facing ends of two consecutive reinforcing elements of the circle C1 (the point M'2 corresponds to the intersection point between the circle C1 and the radius passing through M2 and extending as far as the circle C1).

Figure 3:
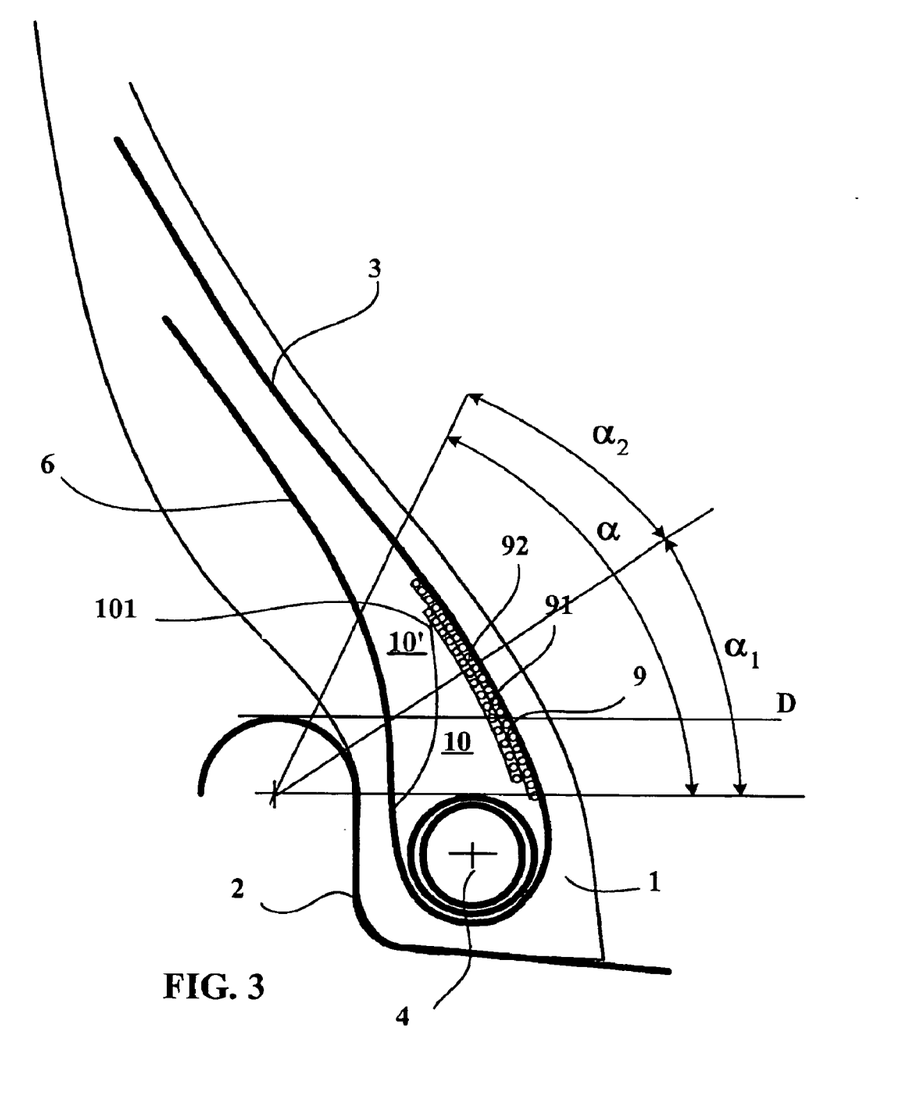
FIG. 3 shows a variant of the positioning of the bead reinforcement plies.
Figures 4, 5:
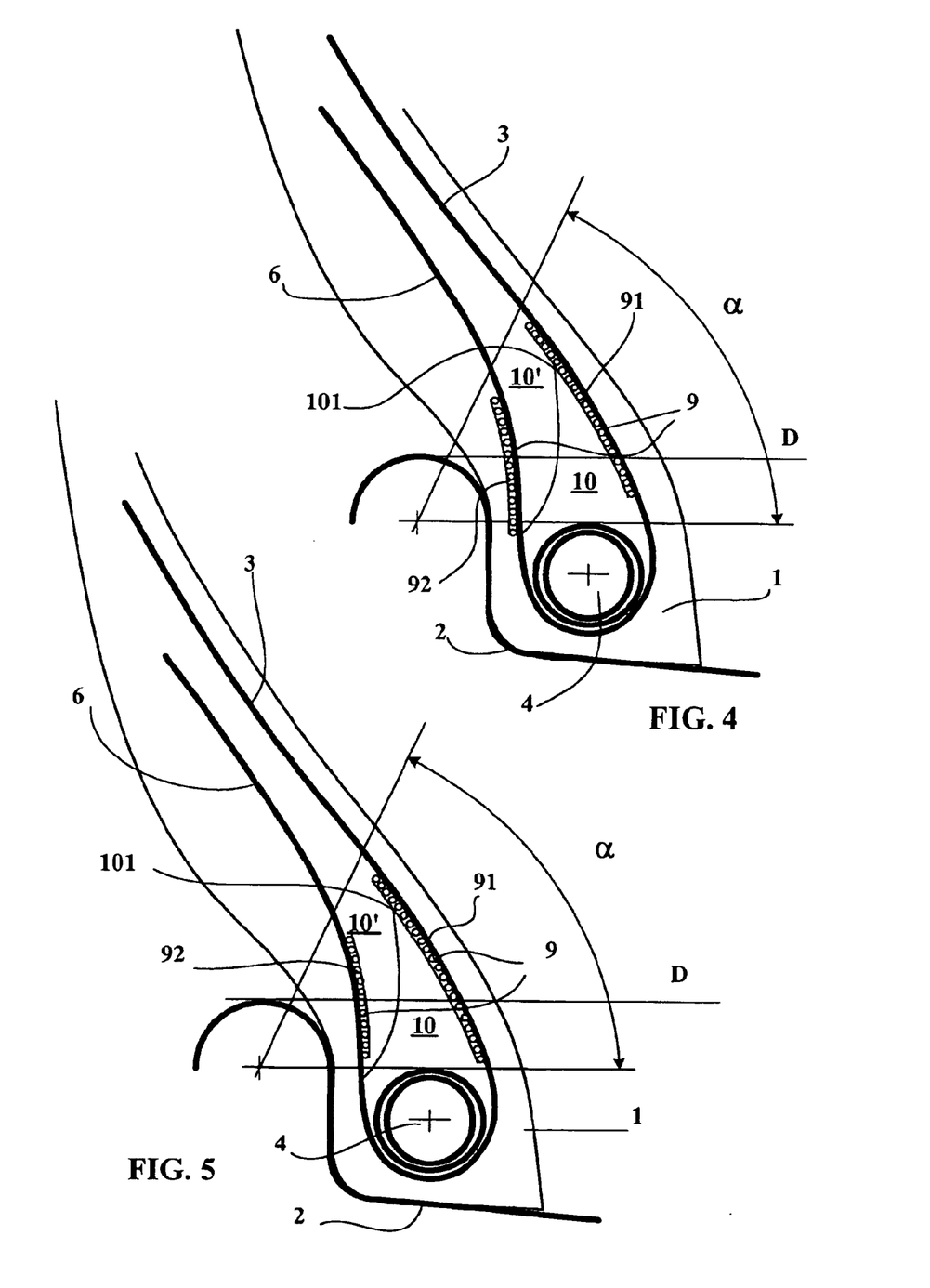
FIG. 4 shows a third variant of a bead according to the invention.
FIG. 5 shows a fourth variant of a bead according to the invention.

FIGS. 3, 4 and 5 show three variant bead structures incorporating an additional reinforcement 9, the said reinforcement comprising two plies of discontinuous reinforcing elements; for convenience, the indexes used in these figures are identical with those of FIGS. 1 and 2 when they designate identical components. For these three variants mounted on a rim 2, the beads 1 comprise a bead wire 4 around which a carcass reinforcement 3 is turned up proceeding axially from the inside outwards; radially outside the bead wire 4 is arranged a profiled element 10 of rubber mix, with an essentially triangular cross-section, whose point 101 furthest away from the bead wire 4 is located axially closer to the carcass reinforcement 3 than to its upturn 6. Another filling mix 10' is additionally provided between this profiled element 10 and the said upturn 6.

In FIG. 3 the two plies 91 and 92 of the additional reinforcement 9 are positioned one against the other and axially outside the carcass reinforcement 3, between the rubber profiled element and the said carcass reinforcement. In this variant each ply 91, 92 is composed of two different reinforcements, namely metallic mono-modular discontinuous cables and bi-modular discontinuous cables such as those used in the variant of FIG. 1. To avoid any fatigue resistance problem of these cables, the mono-module cables are only present within a first sector of angle α1 equal to 45° relative to the axial direction and the bi-module cables complete the said ply in a sector of angle α2 at most equal to 30° and extending the said first sector.

In FIG. 4 a first ply 91 of the additional reinforcement 9 is positioned axially outside the carcass reinforcement 3 against the latter, and a second ply 92 of the additional reinforcement 9 is positioned axially outside the upturn 6 and against it.

In the variant shown in FIG. 5, a first ply 91 of the additional reinforcement 9 is positioned axially outside the carcass reinforcement 3 and against the latter, and a second ply 92 of the additional reinforcement 9 is positioned axially inside and against the upturn 6.

In these three variants, the plies 91 and 92 of the additional reinforcement 9 have their radially outermost ends located within an angular sector of angle α at most equal to 75° and their radially innermost ends located below a line D parallel to the rotation axis and passing through the radially outermost point of the rim. The definition of the angular sector of angle α is the same as that given for the variant of FIG. 1.

Figure 6:
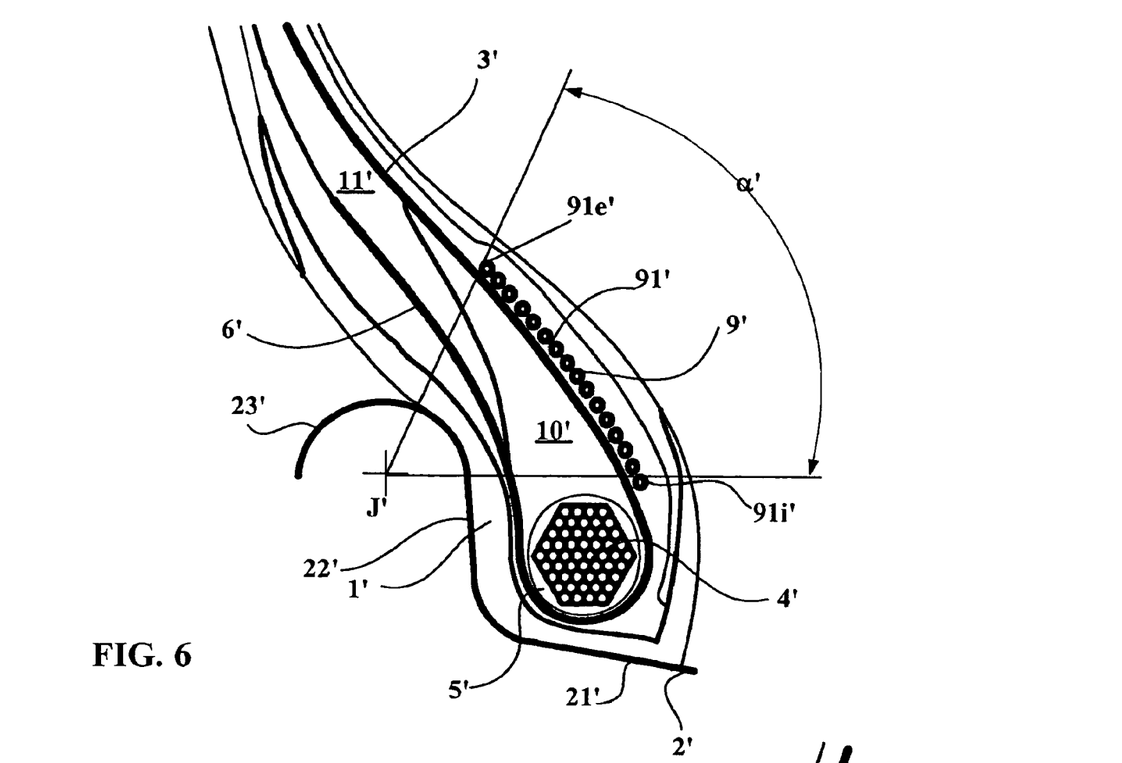
FIG. 6 shows a bead variant for a heavy-vehicle tire, for mounting on a rim having seats extended by a flange.

The section shown in FIG. 6 shows a variant of a bead according to the invention for a tire of size 10.00 R 20 intended for fitting to a heavy vehicle. For the sake of simplicity, the numerical indexes used for FIG. 6 correspond to these used in the other figures, with the difference that they are followed by the prime—'—symbol (for example, the bead indexed 1 for the variants of FIGS. 1 to 5 is indexed 1' in the variant of FIG. 6).

The tire shown in FIG. 6 is mounted on a rim 2' whose seats 21' are extended by flanges 22' themselves ending in hooks 23', in the manner of the rim used for the tire described by the previous figures.

In this example, axially on the inside of the carcass reinforcement 3' is arranged an additional reinforcement 9' formed of a single ply 91' extending between an inner end 91i' and an outer end 91e'. The inner end 91i' is located essentially at the level of the radially outermost part of the bead wire 4' of the bead 1', while the outer end 91e' is located at the radially outer limit of an angular sector of angle α' equal to 64°. The top of this angular sector is at the point J' which is the geometrical centre of the circle forming the hook 23' of the rim 2', and its sides are on the one hand a line passing through this point J' and parallel to the rotation axis of the tire, and on the other hand a line passing through J' and through the outer end 91e'.

The reinforcement ply 91' is formed of a plurality of metallic cables of length 251.2 mm arranged on circles concentric with the rotation axis of the tire.

The cables used for this ply are mono-modular cables of formula 11–35 (i.e. 11 elementary wires 0.35 mm in diameter).

Besides, and according to the invention, the coupling lengths between the cables satisfy the values recommended earlier. In particular, for the cables located on the circles of the tire with largest diameter, the coupling lengths are as follows (retaining the notations used for previous figures and in particular FIG. 2):

L11=157.4 mm (or 62.7% of L0)

L12=33.2 mm (or 13.2% of L0)

L21=64.6 mm (or 25.7% of L0)

L22=126.3 mm (or 50.3% of L0)

In the present case, the couplings between for example a discontinuous reinforcing element on a circle and the two reinforcing elements on the adjacent circle, corresponding to the coupling lengths L11 and L12, satisfy the relationship:

$$1.5 \leq K \leq 4$$

since in this example K is equal to 2.32.

To limit cyclic rotation movements around the bead wire 4' under the effect of cyclic stress variations in the carcass, it is advantageous to use a bead wire 4' whose structure results in high torsional rigidity (i.e. higher than the rigidity of an equivalent so-termed, braided bead wire for the same tire size). In addition, the carcass ply 3' and its upturn 6' are coupled by using two filling rubber mixes 10' and 11', the mix 10' having higher hardness than the mix 11' and being positioned against the covering 5' of the bead wire 4' and axially along the carcass 3' and the additional ply 91'.

Figure 7:
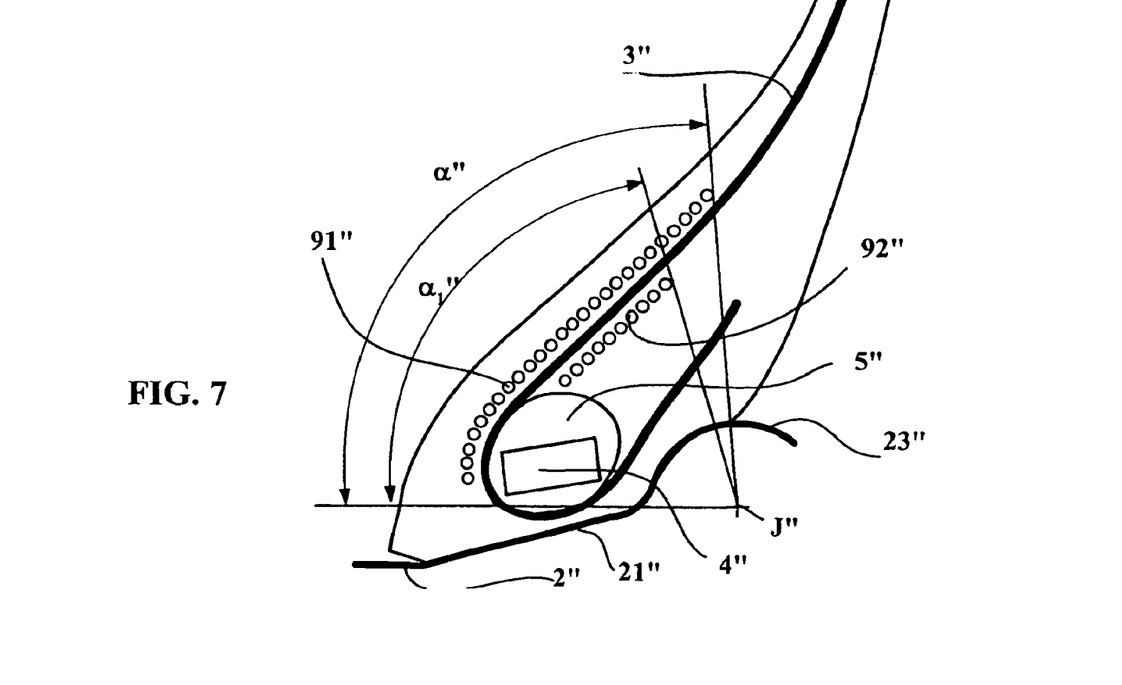
FIG. 7 shows a bead variant for a heavy-vehicle tire, for mounting on a rim having seats which are inclined at an angle of 15° relative to the axial direction.

FIG. 7 shows another variant according to the invention relating to a tire of size 385/65 R 22.5 for heavy loads, intended for mounting on a rim 2" each of whose seats is inclined at an angle of about 15° relative to the axial direction and is directly extended by a hook 23" of substantially circular shape.

Each bead 1" comprises a carcass reinforcement 3" wrapped around a circumferential reinforcement formed of a bead wire 4" and a rubber covering 5" to form an upturn.

Furthermore, the bead 1" comprises an additional reinforcement 9" comprising a first series of discontinuous cables 91" and a second series of discontinuous cables 92".

The first series of discontinuous cables 91" is positioned axially outside the carcass reinforcement 3" and is formed of bi-modular metallic cables (21 wires of 0.28 mm) distributed on a plurality of circles concentric on the rotation axis. The part of this first series of discontinuous cables 91" radially furthest away from the rotation axis is located within an angular sector of angle α" equal to 85°.

The cables of the first series of discontinuous cables 91" furthest away from the rotation axis, whose mean length is equal to 274.2 mm, satisfy the following coupling relationships:

L11=178.3 mm (65.0%)

L12=51.1 mm(18.6%)

L21=83.1 mm (30.3%)
L22=146.4 mm (53.4%)

The second series of discontinuous cables 92" is positioned on the inside of the carcass reinforcement 3" and is formed of mono-modular metallic cable (11 wires of 0.35 mm) distributed on a plurality of circles concentric on the rotation axis. The part of this second series of discontinuous cables 92" radially furthest away from the rotation axis is located within an angular sector of angle $\alpha_1$" equal to 74°.

The cables of the second series of discontinuous cables 92" furthest away from the rotation axis, whose mean length is equal to 270.4 mm, satisfy the following coupling relationships:

L11=170.5 mm (63.1%)
L12=38.3 mm (14.2%)
L21=71.7 mm (26.5%)
L22=137.5 mm (50.8%)

For both series of cables, the value of K is equal to 2.3.

In the variant shown, the bottom end of the first series of discontinuous cable 91" (corresponding to the positioning circle with the smallest radius) is located essentially close to the bead wire 4", while the bottom end of the second series of discontinuous cables 92" is located radially above the covering 5" of the bead wire 4".

The example shown in FIG. 7 is only one variant among others between which a person with knowledge of the field will be able to choose; in particular, the relative position of each of the series of discontinuous cables can be inverted (the mono-modular discontinuous cables being positioned axially on the inside of the carcass reinforcement).

What is claimed is:

1. A tire for vehicles carrying heavy loads, comprising a crown zone extended axially and radially by sidewalls, these in turn being extended by beads designed to come in contact with a mounting rim of the tire, the said rim comprising a part that forms a rim seat comprising radially on the outside a rim hook with a substantially circular cross-section, the sidewalls of the tire being reinforced by a radial carcass reinforcement, the said radial carcass reinforcement extending into the beads of the tire and being anchored therein to a circumferential bead reinforcement, the said tire comprising besides, in at least one bead, an additional reinforcement composed of a plurality of discontinuous reinforcing elements of length L0, these discontinuous reinforcing elements being orientated essentially circumferentially along a plurality of circles C, C1, C2 concentric on the rotation axis of the tire mounted on its rim, each circle being defined by a mean radius (R, R1, R2) measured relative to the said rotation axis, each discontinuous reinforcing element of length L0 located on a circle C of radius R being mechanically coupled over coupling lengths L11 and L12 respectively with two discontinuous reinforcing elements located on a circle C1 of radius R1 smaller than the radius R, the said circle being immediately adjacent to the circle C, wherein the coupling lengths L11 and L12, L11 being taken as larger than or equal to L12, satisfy the following relationship:

$$1.5 \leq K \leq 4$$

$$\text{where: } K = \frac{\left(1 - \frac{L12}{L0}\right)}{\left(1 - \frac{L11}{L0}\right)}.$$

2. The tire of claim 1, wherein:
   (a) each discontinuous reinforcing element of length L0 located on a circle C of radius R is mechanically coupled over coupling lengths L11 and L12 with two discontinuous reinforcing elements located on a circle C1 of radius R1, this circle being immediately adjacent to the circle C, the coupling length L11 being between 55 and 75% of L0 and the coupling length L12 being between 10 and 30% of L0;
   (b) each discontinuous reinforcing element on the same circle C of radius R is mechanically coupled over coupling lengths L21 and L22 with two discontinuous reinforcing elements located on a circle C2 of radius R2 immediately adjacent to the circle C1, the coupling length L21 being between 20 and 40% of L0 and the coupling length L22 being between 45 and 65% of L0.

3. The tire of claim 1, wherein the discontinuous reinforcing elements have an average length between ⅓ and ½ of the circumferential length of the bead wire (4) measured along the radially innermost points of the said bead wire.

4. The tire according to claim 2, wherein the discontinuous reinforcing elements have an average length between ⅓ and ½ of the circumferential length of the bead wire (4) measured along the radially innermost points of the said bead wire.

5. The tire of claim 1 wherein the additional reinforcement comprises at least two plies, one of these plies being positioned axially inside the carcass and against the said carcass.

6. The tire of claim 4 wherein at least one other ply of the additional reinforcement is located axially inside or outside the upturn of the carcass and against it.

7. The tire of claim 1 wherein the ends radially outside the additional reinforcement are located radially below a line J2 passing through the centre J of the cross-section of the rim hook and making an angle $\alpha$, open axially inwards and radially outwards, equal to at most 90°.

8. The tire of claim 1 wherein at least one additional reinforcement comprises discontinuous reinforcing elements which are bi-modular, i.e. whose force-elongation curve has two distinct slopes, the slope at the origin and at small elongations being less steep than the slope at large elongations.

9. The tire of claim 7 wherein the bi-modular discontinuous reinforcing elements extend at most within an angular sector of angle at most equal to 90°, and the additional reinforcement also comprises mom-modular discontinuous reinforcements that extend at most within an angular sector at most equal to 75°, the said sectors having their top at the centre of the external profile of the rim hook, these angles being measured between a line parallel to the rotation axis and passing through the said centre J when the tire is mounted on its rim, and a line passing through the same point.

10. The tire of claim 8 wherein it is designed for mounting on a rim whose seats are extended by flanges themselves ending in hooks, and the bi-modular reinforcing elements extend at most within an angular sector of angle at most equal to 80°, while the mono-modular discontinuous reinforcing elements extend at most within an angular sector of angle at most equal to 45°.

11. The tire of claim 2, wherein the discontinuous reinforcing elements have an average length between ⅓ and ½ of the circumferential length of the bead wire (4) measured along the radially innermost points of the said bead wire.

12. The tire of claim 10 wherein the additional reinforcement comprises at least two plies, one of these plies being positioned axially inside the carcass and against the said carcass.

13. The tire of claim 11 wherein at least one other ply of the additional reinforcement is located axially inside or outside the upturn of the carcass and against it.

14. The tire of claim 10 wherein the ends radially outside the additional reinforcement are located radially below a line J2 passing through the centre J of the cross-section of the rim hook and making an angle α, open axially inwards and radially outwards, equal to at most 90°.

15. The tire of claim 10 wherein at least one additional reinforcement comprises discontinuous reinforcing elements which are bi-modular, i.e. whose force-elongation curve has two distinct slopes, the slope at the origin and at small elongations being less steep than the slope at large elongations.

16. The tire of claim 14 wherein the bi-modular discontinuous reinforcing elements extend at most within an angular sector of angle at most equal to 90°, and the additional reinforcement also comprises mom-modular discontinuous reinforcements that extend at most within an angular sector at most equal to 75°, the said sectors having their top at the centre of the external profile of the rim hook, these angles being measured between a line parallel to the rotation axis and passing through the said centre J when the tire is mounted on its rim, and a line passing through the same point.

17. The tire of claim 15 wherein it is designed for mounting on a rim whose seats are extended by flanges themselves ending in hooks, and the bi-modular reinforcing elements extend at most within an angular sector of angle at most equal to 80°, while the mono-modular discontinuous reinforcing elements extend at most within an angular sector of angle at most equal to 45°.

18. A tire for vehicles carrying heavy loads, comprising a crown zone extended axially and radially by sidewalls, the latter being themselves extended by beads designed to come in contact with a mounting rim of the tire, this rim comprising a portion forming a rim seat which comprises, radially on the outside, a rim hook of substantially circular cross-section, the sidewalls of the tire being reinforced by a radial carcass reinforcement, this radial carcass reinforcement extending into the bead of the tire to be anchored on a circumferential bead reinforcement, the said tire also comprising in at least one bead an additional reinforcement composed of a plurality of discontinuous reinforcing elements of length L0, these discontinuous reinforcing elements being orientated essentially circumferentially along a plurality of circles C, C1, C2 concentric on the rotation axis of the tire mounted on its rim, each circle being defined by a mean radius (R, R1, R2) measured relative to the said rotation axis, each discontinuous reinforcing element of length L0 located on a circle C of radius R being coupled mechanically over coupling lengths L11 and L12 respectively with two discontinuous reinforcing elements located on a circle C1 of radius R1 smaller than the radius R, the said circle being immediately adjacent to the circle C, wherein:

each discontinuous reinforcing element of length L0 located on a circle C of radius R is coupled mechanically over coupling lengths L11 and L12 with two discontinuous reinforcing elements located on a circle C1 of radius R1, this circle being immediately adjacent to the circle C, the coupling length L11 being between 55 and 75% of L0 and the coupling length L12 being between 10 and 30% of L0;

each discontinuous reinforcing element on the same circle C of radius R is coupled mechanically over coupling lengths L21 and L22 with two discontinuous reinforcing element located on a circle C2 of radius R2 immediately adjacent to the circle C1, the coupling length L21 being between 20 and 40% of L0 and the coupling length L22 being between 45 and 65% of L0.

* * * * *